March 10, 1959 D. SAKS ET AL 2,876,587
CANDLESTICK FLOWER ARRANGER
Filed Oct. 1, 1954
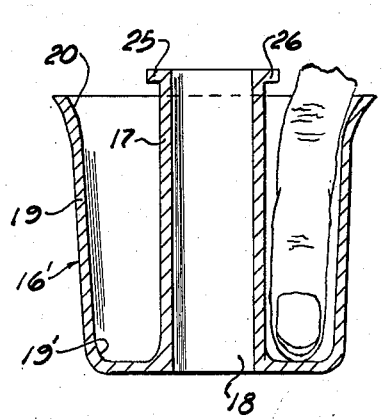
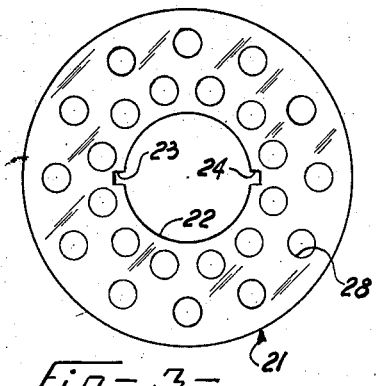
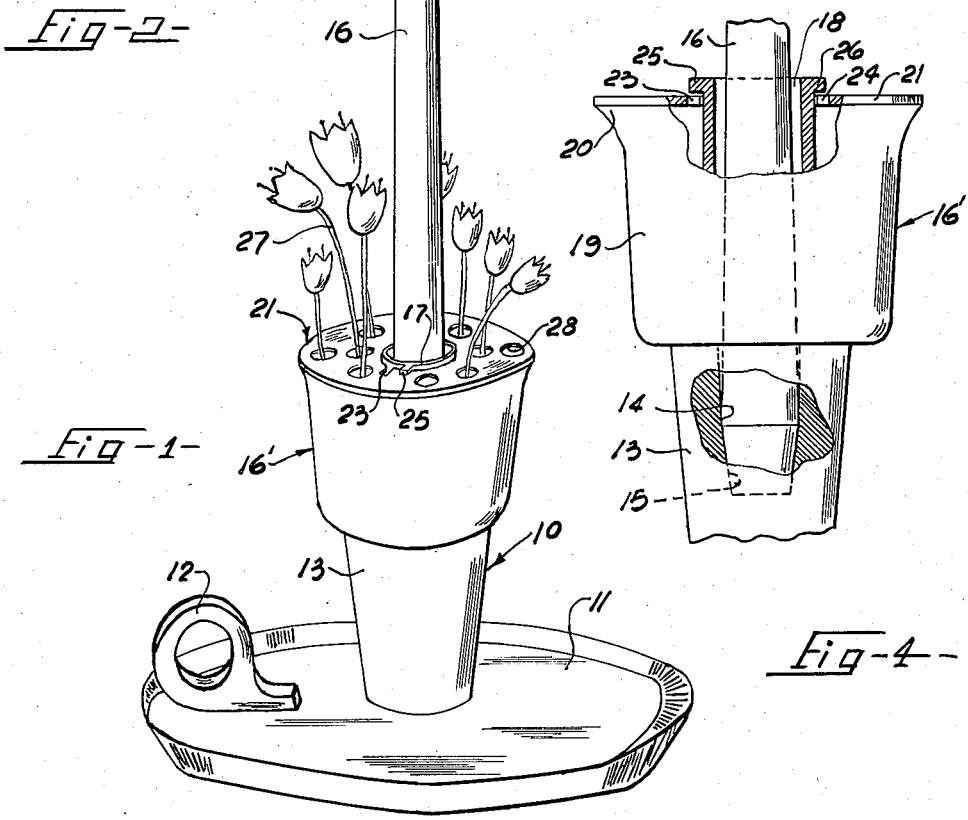
INVENTOR.
DAVID SAKS AND
BY FAY SAKS
L. S. Saulsbury
ATTORNEY

2,876,587

CANDLESTICK FLOWER ARRANGER

David Saks and Fay Saks, White Plains, N. Y., assignors to Candlestick Flower Arranger, Inc., White Plains, N. Y.

Application October 1, 1954, Serial No. 459,653

1 Claim. (Cl. 47—41)

This invention relates to a candlestick flower arranger.

It is an object of the present invention to provide a candlestick flower arranger having the ability to be fitted over the candle and supported upon the holder with a separate grill or annular member to support and anchor the stems of the flowers arranged about the candle and thereby to prevent them from falling out of the arranger.

It is another object of the invention to provide a candlestick flower arranger which is so shaped and flared at its upper periphery as to permit the easy insertion of a finger and the easy cleaning of the arranger when removed from the candlestick holder.

It is another object of the invention to provide in a candlestick flower arranger a separable top grill with means for affixing and retaining the grill upon the top of the water container.

Other objects of the invention are to provide a candlestick flower arranger which is of simple construction, has a minimum number of parts, inexpensive to manufacture, easy to assemble upon the candlestick and its holder, sanitary, of pleasing appearance, effective and efficient in use.

For a better understanding of the invention, reference may be had to the following detailed description taken in connection with the accompanying drawing, in which:

Figure 1 is a perspective view of a candlestick holder, and its candle, with the candlestick flower arranger of the present invention assembled thereupon;

Fig. 2 is a vertical sectional view of the bottom container with illustration made as to how a finger may be extended into the container to clean the same;

Fig. 3 is a top plan view of the grill element;

Fig. 4 is a fragmentary elevational view of a portion of the holder and the candlestick and of the candlestick flower arranger assembly, the portions being broken away to show the connection of the separate grill upon the container and the connection of the candle upon the holder.

Referring now to the figures, 10 represents a candlestick holder having a base portion 11 with a finger grip portion 12 thereon and an upstanding portion 13 having an opening 14 with a tapered lower end 15 into which the lower end of a candle 16 is seated and retained in the usual manner.

With the candle in place, there is fitted a container 16' of the present invention over the candle and slid downwardly for support upon the upper end of the upstanding portion 13 of the candlestick holder. This container is formed of plastic and has a central tubular upstanding portion 17 providing a vertical opening 18 to accommodate the candle 16. The tubular portion 17 is concentric with the outer wall portion 19 and they are sufficiently spaced and shaped to permit the easy insertion of a finger therebetween, as illustrated in Fig. 2, in order to facilitate the cleaning of the container with the finger. The bottom of the opening provided by the container is preferably rounded as indicated at 19' to prevent the collection of dirt and is flared at its upper end as indicated at 20 so as to make possible the easy insertion of the finger and to provide a curved inner surface over which the side of the finger can slide.

The upstanding sleeve portion 17 extends upwardly beyond the upper edge of the flange 20 to accommodate a separate annular shaped grill or perforated member 21 having a central opening 22 adapted to receive the upper end of the sleeve portion 17 and sufficiently wide to extend over the flange 20 and rest thereupon. This member 21 is also preferably made of plastic or transparent material. The opening 20 has diametrically opposed notches 23 and 24 adapted to respectively permit the member 21 to be set over diametrically-opposite radially-extending projections 25 and 26 on the upper end of the sleeve portion 17. After the member 21 is in place and has been rotated slightly so that the notches are out of registry with the projections 25 and 26, the member 21 is locked upon the flange 20 of the container and held against disengagement therefrom.

With the container 16' in place upon the candlestick holder, the same can be partly filled with water and thereafter the grill member 21 can be fitted over the sleeve portion 17 and rotated to be locked under the projections 25 and 26. With the member 21 in place and the arranger fully assembled upon the candlestick, stems 27 can be inserted through any one of a plurality of holes 28 in the member 21 and into the water contained therein.

The radially-extending projections 25 and 26 upon the sleeve portion 17 lie above the upper edge of the container a distance substantially the thickness of the detachable annular grill member so that the grill member 21 will be held tight against rotational and vertical displacement in a frictional manner upon the container when once placed in its locked position. This will keep the grill member from turning while placing the flower stems into the arranger and prevent its easy removal therefrom.

Both the container and the member are preferably made of plastic so as to be unbreakable. With the flowers and fresh greens assembled in the container, a decorative flower arrangement is had upon the candlestick and about the candles. The assembly is simple as it is only necessary to slide the same downwardly over the candle and it will set upon any candlestick. The candle can be removed and replaced, and likewise the assembly can be removed from the candle and the flowers arranged in it before setting the same upon the candlestick. The stems of the flowers will be well anchored about the candle and will be held in an upright and attractive manner and close to the candle.

While various changes may be made in the detail construction, it shall be understood that such changes shall be within the spirit and scope of the present invention as defined by the appended claim.

What is claimed is:

A candlestick flower arranger comprising a container having side walls, a bottom and a central sleeve open at both ends and extending upwardly beyond the upper edge of said side walls, a detachable annular grill member provided with a central opening to receive said upper end of said sleeve portion and resting upon said upper edge of said container, the central sleeve portion having diametrically opposite projections extending radially from the exterior thereof and at its upper end, said annular grill member having corresponding and cooperating notches in the central opening thereof and adapted when the annular member is placed upon the container to register with the respective projections of the sleeve portion and to be angled out of alignment with the sleeve projections and upon the sleeve to lock the annular member upon the container, said radially-extending projections of the sleeve portion lying above the upper edge of the container substantially the thickness of the detachable grill member whereby the grill member will be held frictionally tight upon the container when once placed in its locked position.

References Cited in the file of this patent

UNITED STATES PATENTS

| | | |
|---|---|---|
| 1,391,353 | Wells | Sept. 20, 1921 |
| 2,486,932 | Elliott | Nov. 1, 1949 |
| 2,686,989 | Dillon et al. | Aug. 24, 1954 |

FOREIGN PATENTS

| | | |
|---|---|---|
| 291,915 | Great Britain | June 14, 1928 |
| 136,868 | Switzerland | Feb. 17, 1930 |
| 183,127 | Switzerland | June 2, 1936 |